United States Patent
Baccouche et al.

(10) Patent No.: US 8,201,875 B2
(45) Date of Patent: Jun. 19, 2012

(54) SUB-FRAME FOR MANAGING CRASH ENERGY

(75) Inventors: Mohamed Ridha Baccouche, Ann Arbor, MI (US); Saied Nusier, Canton, MI (US); Jamel E. Belwafa, Ann Arbor, MI (US); Michael Azzouz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 12/783,529

(22) Filed: May 19, 2010

(65) Prior Publication Data
US 2011/0285176 A1    Nov. 24, 2011

(51) Int. Cl.
*B62D 21/02* (2006.01)
(52) U.S. Cl. .................................................. 296/204
(58) Field of Classification Search ............ 296/187.08, 296/193.07, 203.01, 204, 205, 203.02, 203.03, 296/203.04
See application file for complete search history.

(56) References Cited

U.S. PATENT DOCUMENTS

| | | | |
|---|---|---|---|
| 5,681,057 A * | 10/1997 | Whirley et al. | 280/784 |
| 6,183,013 B1 * | 2/2001 | Mackenzie et al. | 280/797 |
| 6,938,948 B1 * | 9/2005 | Cornell et al. | 296/187.09 |
| 7,213,873 B2 * | 5/2007 | Murata et al. | 296/204 |
| 7,370,886 B2 * | 5/2008 | Luttinen et al. | 280/781 |
| 7,520,514 B2 * | 4/2009 | Ogawa et al. | 280/124.109 |
| 7,677,649 B2 * | 3/2010 | Hedderly | 296/193.07 |
| 2003/0184124 A1 * | 10/2003 | Yamaguchi | 296/204 |
| 2004/0051344 A1 * | 3/2004 | Erlandsson et al. | 296/193.07 |

* cited by examiner

*Primary Examiner* — Lori Lyjak
(74) *Attorney, Agent, or Firm* — Fredrick V. Owens; Joseph E. Root

(57) ABSTRACT

A vehicle sub-frame structure including a forward zone, extending substantially in the transverse direction towards the front of the vehicle. The forward zone has a first set of hinges and supports a radiator. A middle zone, including a pair of left and right members, extends substantially longitudinally and carries a second set of hinges. A rear zone includes a beam and is disposed substantially in the transverse direction. Both ends of the beam are attached to the sub-frame structure.

20 Claims, 2 Drawing Sheets

SUB-FRAME FOR MANAGING CRASH ENERGY

BACKGROUND

This application relates generally to the field of vehicle chassis design, and more particularly to automotive sub-frames.

A sub-frame is a structural vehicle sub-system that carries certain components, such as the engine, drivetrain, radiator, or suspension. The sub-frame is either bolted or welded to the vehicle. When bolted, the sub-frame is equipped with rubber bushings to dampen and isolate vibration and harshness from the rest of the body during vehicle movement. In a power-train-supporting sub-frame, forces generated by the engine and transmission can be lowered to a level that does not disturb passengers. The most common type of sub-frame is the "K" brace type, which typically carries the lower control arms and steering rack. Another common sub-frame is the perimeter sub-frame, which carries vehicle components in addition to providing support for the engine.

Existing sub-frame designs, however, suffer from poor crash energy management, are very heavy, and have inefficient load path architecture. Such an architecture results in a constrained design having low load and deceleration levels in the structure, such as the bumper, the crash can, or the front rails, early in a crash event (for example, 10 to 15 msec). Generally, sub-frames stop short from reaching the front of the vehicle, so during a crash, the energy is absorbed by the crash can or the front rails. Thus, the sub-frame is not engaged early in the crash and fails to reach the required load and deceleration levels.

Sub-frames are typically heavy, and their rigid design tends to transfer crash load to the rear end of the sub-frame, which can injure passengers seated within the vehicle. A crash can cause significant damage to a sub-frame and may require sub-frame replacement, which is expensive and often difficult. Further, vehicles often include support for a radiator towards the front, which adds considerably to the weight of the vehicle. Radiator supports can be bulky, and they occupy a large amount of space, reducing crashworthiness of the vehicle.

It would be highly desirable to have a light-weight sub-frame design with improved crash energy managing capabilities, which absorbs significant crash energy at the front of the vehicle and isolates the passengers within the vehicle from the impact of the crash.

SUMMARY

One embodiment of the present application describes a vehicle sub-frame structure including a forward zone, extending substantially in the transverse direction towards the front of the vehicle. The forward zone has a first set of hinges and supports a radiator. A middle zone, including a pair of left and right members, extends substantially longitudinally and carries a second set of hinges. A rear zone includes a beam and is disposed substantially in the transverse direction. Both ends of the beam are attached to the sub-frame structure.

Another embodiment of the present application discloses a vehicle sub-frame structure including two detachable sections—a first section and a second section. The first section is substantially C-shaped and includes a forward zone, extending substantially in the transverse direction towards the front of the vehicle having six hinges, for impact absorption. Further, the first section includes a middle zone, including a pair of left and right members, extending substantially longitudinally, each member extending rearward from the front zone. The second section includes a beam and is disposed substantially in the transverse direction rearward of the middle zone. Both ends of the beam are attached to the middle zone of the first section. The first section is bolted to the second section.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

In general, the present disclosure describes a vehicle sub-frame that combines light weight with improved crashworthiness and streamlined design. The embodiments of the present disclosure introduce crash energy-managing hinges in the design for improving crashworthiness. The sub-frame structures possess two-tier stiffness—a strong rear zone to manage dynamic forces from the lower control arms and weight-saving mid/forward zones to manage crash energy.

In the event of a front-end collision, the crash energy delivered to the front structure is absorbed by the collapse of a crash space at the front of the vehicle. If the crash space does not completely absorb the crash energy, the passenger cabin can become deformed, which mandates that the crash space should be as large as possible. In the present design, the forward zone allows attachment of a radiator to the sub-frame, thus eliminating additional radiator supports and brackets/attachments traditionally present at the front of a vehicle sub-frame. The disclosed sub-frame designs provide more crash space by eliminating the need to weld radiator brackets to the front rails, freeing up the crash space otherwise occupied by radiator brackets.

Figure 1:
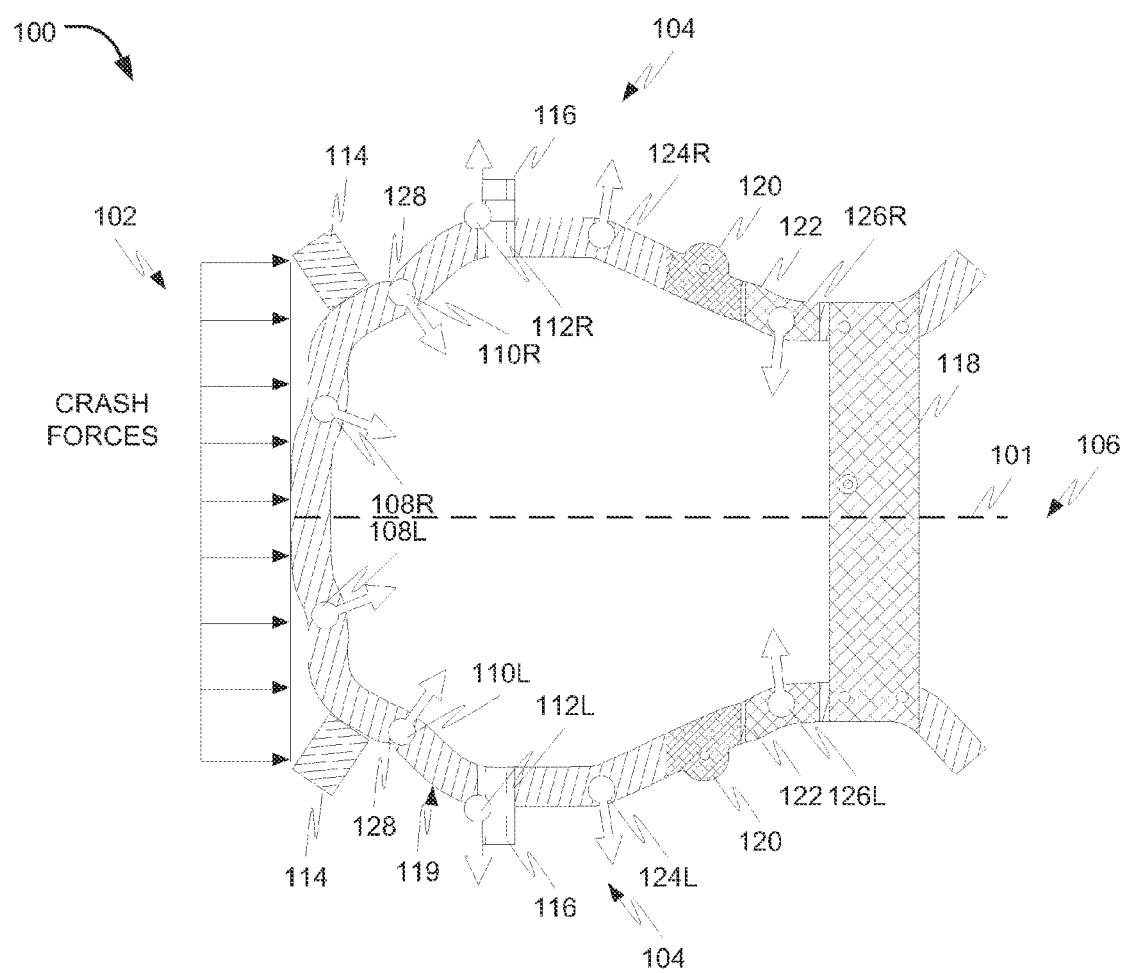
FIG. 1 illustrates an exemplary embodiment of a sub-frame for managing crash energy in a vehicle.

FIG. 1 illustrates an exemplary embodiment of a sub-frame 100 for managing crash energy in a vehicle. FIG. 1 shows a top view of the sub-frame 100, formed as a perimeter sub-frame having a substantially rectangular shape. It should be noted that the sub-frame 100 is substantially symmetrical about the longitudinal axis 101, and as a result, the elements in the right side of the sub-frame 100 (upper half of FIG. 1, above the longitudinal axis) may be substantially similar to the elements in the left side of the sub-frame 100 (lower half of FIG. 1, below the longitudinal axis).

The sub-frame 100 includes three zones: a forward zone 102 between a bumper and an engine; a middle zone 104 extending rearwards from the forward zone 102 in the form of left and right side members carrying vehicle components, such as the engine; and a rear zone 106 situated in close proximity to the suspension and front wheels. The forward zone 102 extends substantially in the transverse direction and lies in close proximity to the front of the vehicle. It may be located immediately behind the bumper. The two ends of the substantially transverse forward zone 102 join the middle zone 104, described below. The forward zone 102 has six hinges 108L, 108R, 110L, 110R, 112L, and 112R. These hinges may be structurally thinned pockets of a section of the sub-frame 100, including a bend in the sub-frame 100 and a reduction in the cross-section of the sub-frame 100. Alternatively, the hinges can be formed as a V-neck thinning of the sub-frame 100. In either event, the hinges are formed into the sub-frame 100 to create weakened portions of that component. Those in the art will understand how to achieve the end sections described above, or, alternatively, the hinges may be formed in any suitable manner known in the art.

Typically, the hinges collapse during impact, absorbing crash energy and confining it to the front of the vehicle, as discussed in more detail below. The number of hinges may vary in other embodiments of the present disclosure, and it will be clear to those in the art that the number and position of the hinges may be altered without affecting the scope or functionality of the claimed design. In addition, the forward zone 102 includes supports 114 for supporting a radiator (position indicated, but details omitted for simplicity).

The forward zone 102 extends substantially transversally between posts-to-rails 116 that support the mid-rails (not shown). The rear zone 106 includes a beam 118 disposed substantially in the transverse direction. Structurally, the sub-frame 100 may be formed from two pieces—the first piece being a substantially C-shaped piece 119 that includes the forward zone 102 and the middle zone 104, and the second piece being the beam 118. Both ends of the beam 118 may be bolted to the sides of the sub-frame 100 structure, as shown in FIG. 1. Alternatively, the beam 118 may be welded to the sub-frame 100 structure. One end of the lower control arms (not shown) may be attached to the two ends of the beam 118 while the other end is coupled to the wheels of the vehicle.

The middle zone 104 extends substantially longitudinally between the forward zone 102 and the rear zone 106. The middle zone 104 further includes lower control arm (LCA) attachment brackets 120 and reinforcement steering rack attachments 122. On both left and right sides, the middle zone 104 extends from the posts-to-rails 116 to the reinforcement steering rack attachments 122. The middle zone 104 carries two hinges 124R and 126R on the right side and two hinges 124L and 126L on the left side.

In the illustrated embodiment, the hinges 108L, 110L, 112L, 108R, 110R, 112R, 124R, 126R, 124L, and 126L are conventional bending type hinges. Those skilled in the art, however, will recognize that any other type of suitable hinge known in the art, which may be installed in the forward zone 102 and collapses to absorb significant crash energy while restricting rearward transfer of crash energy, may be used. A bending type hinge may be formed by structural thinning of the sub-frame 100 structure. Alternatively, a bending type hinge may be formed as a V-neck thinning of the sub-frame 100 structure.

These hinges implement an energy management mechanism. For example, consider the effects of a front-end collision, on the right side of the sub-frame 100 (upper half of the sub-frame 100). As shown in FIG. 1, crash forces are applied from the front, onto the forward zone 102. The portion of the sub-frame 100 between the hinges 108R and 108L experiences the impact of the crash forces first, and as a result, the portion of the sub-frame 100 between the hinges 108R and 108L is pushed inward and becomes flattened.

The hinge 110R may be an axial hinge, which collapses inward in the event of a collision. It should be noted that the portion of the forward zone 102 carrying the hinge 110R is at an acute angle with the longitudinal axis. In one implementation, the acute angle is approximately twenty degrees. Moreover, in FIG. 1, the portion of the forward zone 102 carrying the hinge 110R includes an indentation 128 in the vicinity of the hinge 110R, which, during a collision, facilitates the inward collapse.

During a crash, the hinge 112R serves to push the portion of the forward zone 102, carrying the hinge 112R, transversally outboard. FIG. 1 shows that each hinge is accompanied by a curve in the sub-frame 100 structure that facilitates the bending of the hinge in the desired direction during a collision; for example, the portion of the forward zone 102 carrying the hinge 108R is curved inward, aiding the inward collapse of the hinge 108R during a collision. During a crash, energy may be absorbed by forming bending hinges in a sub-frame at pre-existing geometrical changes (bends, curvatures, and indentations) that facilitate hinge creation. The curves, bends, and indentations in the sub-frame 100 represent just one exemplary configuration and contribute to the successful absorption of crash energy. It will be understood by those skilled in the art that the sub-frame may be curved or bent in any direction, based on the requirement.

In the event of a crash, the hinges 108R, 110R, and 112R buckle, absorbing significant crash energy. If the crash load applied to the front-end of the vehicle is considerably high, in addition to the hinges buckling, the C-shaped piece 119 may become detached from the beam 118, thus absorbing more crash energy. In this manner, the hinges 108R, 110R, and 112R restrict the crash energy to the forward zone 102 and the middle zone 104 and transfer little crash energy to the rear zone 106, protecting passengers. Similarly, the hinges 108L, 110L, and 112L manage the crash energy in the left side of the sub-frame 100 (lower half of FIG. 1) by performing in a manner similar to the hinges 108R, 110R, and 112R, respectively.

In the middle zone 104, the hinge 124R pushes transversally outboard while the hinge 126R collapses inward toward the vehicle. On the left side of the sub-frame 100 (lower part of FIG. 1), the hinges 124L and 126L behave similarly to the hinges 124R and 126R, respectively.

During a crash, the hinges in the sub-frame 100 manage crash energy efficiently, transferring minimum crash force to the passengers within the vehicle. The sub-frame 100 may isolate the rear zone 106 from the crash forces by deforming the forward zone 102 hinges during a crash. As the beam 118 is bolted to the sub-frame 100 structure, the damaged component may simply be removed and replaced, precluding the need to replace the entire sub-frame 100, making the design cost-effective, scalable to suit different-sized vehicles, and easily replaceable. For example, in case the sub-frame includes a C-shaped piece bolted to a rear beam, the front portion of the C-shaped piece, carrying the hinges, will deform during a crash. The deformed C-shaped piece can be unbolted from the beam (which can be retained in the vehicle) and replaced with a new C-shaped piece, without requiring replacement of the entire sub-frame.

In one embodiment, the radiator supports 114 are radiator supporting brackets mounted on the forward zone 102 of the sub-frame 100. In another embodiment, the radiator is supported by the forward zone 102 itself and may be bolted to the forward zone 102. Such radiator supports obviate the need for any additional radiator support or brackets that are typically present in a vehicle. Moreover, in certain implementations, the front portion of the forward zone 102 lies behind the bumper, since no additional support for the radiator occupies the space between the bumper and the sub-frame 100. Elimination of conventional radiator supports not only introduces a reduction in weight, but also releases crash space in the front rails (not shown), increasing crashworthiness.

The sub-frame 100 may be manufactured through an aluminum extrusion process, thus making the sub-frame light. In one implementation, hydroforming is employed for the sub-frame 100 manufacture. In another implementation, the sub-frame 100 may be manufactured from steel. Those of skill in the art will comprehend that any suitable material or process of manufacture may be employed for forming the sub-frame 100.

Figure 2:
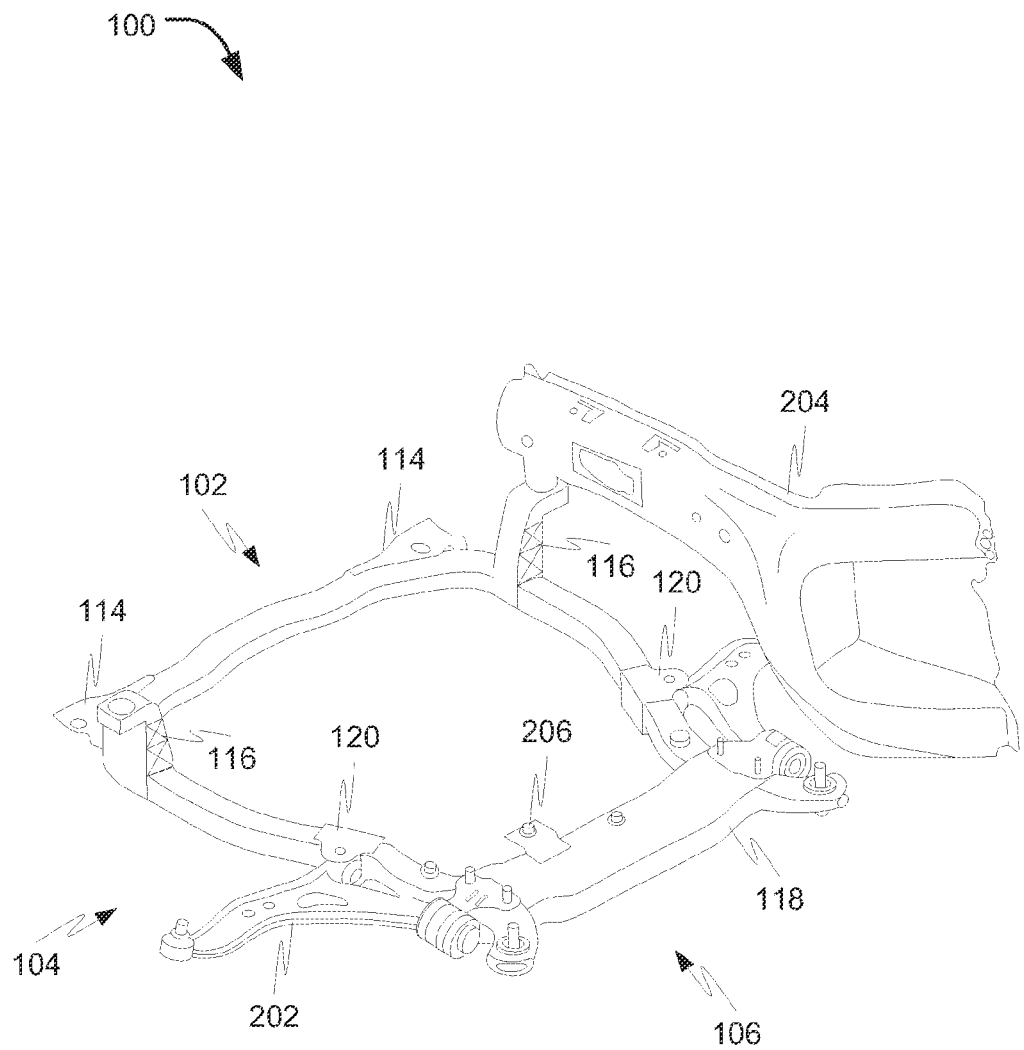
FIG. 2 is an alternate view of the sub-frame of FIG. 1, showing attachments to various vehicle components.

FIG. 2 illustrates an alternate view of the sub-frame 100 of FIG. 1, attached to various vehicle components such as mid rails, LCAs, and sled runners. FIG. 2 shows the radiator supports 114 with more clarity; the radiator may be bolted onto the forward zone 102 of the sub-frame 100.

FIG. 2 also shows LCAs 202 attached to the sub-frame 100. Further, the post to rail 116 is shown attached to mid rail 204. The beam 118 carries a roll restrictor bracket 206.

The embodiments of a vehicle sub-frame set out above carry hinges that allow effective crash energy management. Further, the sub-frame is manufactured to be light-weight and is designed to provide radiator support, obviating the need for traditional radiator supports that add considerable weight and occupy space, thus reducing crashworthiness. The sub-frame structure may be a two-piece structure allowing easy removal and replacement of only the damaged sub-frame parts, making this design more scalable and tunable to suit a variety of vehicles.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A vehicle sub-frame structure comprising:
   a forward zone, located generally toward the front of the vehicle and extending substantially transversely, the forward zone having a first set of hinges and being configured to support a radiator;
   a middle zone, including a pair of left and right members, extending substantially longitudinally, the middle zone connecting to the forward zone and having a second set of hinges; and
   a rear zone including a beam, connected to the middle zone and disposed substantially transversely, both ends of the beam being attached to the sub-frame structure.

2. The vehicle sub-frame structure of claim 1, wherein the first set of hinges includes six hinges.

3. The vehicle sub-frame structure of claim 1, wherein the second set of hinges includes four hinges.

4. The vehicle sub-frame structure of claim 1, wherein the first set of hinges includes one or more conventional bending hinges.

5. The vehicle sub-frame structure of claim 1, wherein the front zone carries brackets for supporting the radiator.

6. The vehicle sub-frame structure of claim 1, wherein the sub-frame is formed from aluminum.

7. The vehicle sub-frame structure of claim 1, wherein the sub-frame is manufactured through an aluminum extrusion process.

8. The vehicle sub-frame structure of claim 1, wherein the sub-frame is manufactured through a hydroforming process.

9. The vehicle sub-frame structure of claim 1, wherein the beam is bolted to the sub-frame structure.

10. The vehicle sub-frame structure of claim 1, wherein the forward zone includes an indentation in the vicinity of a hinge, which, during an impact, facilitates inward movement of the part of the forward zone that carries the hinge.

11. The vehicle sub-frame structure of claim 1, wherein the sub-frame structure is curved in the vicinity of each hinge from the first set of hinges or the second set of hinges, facilitating the bending of the hinge in the desired direction during an impact.

12. The vehicle sub-frame structure of claim 1, wherein the sub-frame structure includes two detachable sections including:
   a first section being substantially C-shaped, wherein the first section includes the forward zone and the middle zone; and
   a second section including the beam.

13. The vehicle sub-frame structure of claim 1, wherein the sub-frame is a substantially rectangular, perimeter structure.

14. A vehicle sub-frame structure comprising:
   a forward zone, located generally toward the front of the vehicle and extending substantially transversely, including a pair of left and right members having three hinges each, for impact absorption, wherein the forward zone is configured to support a radiator;
   a middle zone, including a pair of left and right members, extending substantially longitudinally, the middle zone connecting to the forward zone and each member having two hinges each; and
   a rear zone including a beam, disposed substantially transversely, both ends of the beam being bolted to the middle zone, wherein the rear zone is configured to carry lower control arms and a steering rack;
   wherein the sub-frame is a substantially rectangular, perimeter structure.

15. The vehicle sub-frame structure of claim 14, wherein each of the left and right members of the front zone include:
   a first section, extending substantially transversally towards the front of the vehicle, carrying a first hinge; and
   a second section, extending between the first section and the middle zone, at an acute angle with the longitudinal axis, wherein the second section carries two hinges.

16. The vehicle sub-frame structure of claim 15, wherein the acute angle is approximately twenty degrees.

17. A vehicle sub-frame structure located at the front-end of a vehicle, the sub-frame comprising:
   a forward zone, located generally toward the front of the vehicle and extending substantially transversely behind a bumper, the forward zone having a first set of hinges and being configured to support a radiator;
   a middle zone, including a pair of left and right members, extending substantially longitudinally, the middle zone connecting to the forward zone and having a second set of hinges, wherein the middle zone lies rearward of the front zone and is operatively coupled to lower control arms; and
   a rear zone including a beam, connected to the middle zone and disposed substantially transversely, both ends of the beam being attached to the sub-frame structure, wherein the rear zone lies in the vicinity of the front wheels of the vehicle;
   wherein the sub-frame is a substantially rectangular, perimeter structure.

18. A vehicle sub-frame structure comprising:
two detachable sections including:
- a first section being substantially C-shaped, wherein the first section includes:
  - a forward zone, located generally toward the front of the vehicle and extending substantially transversely, the forward zone having six hinges for impact absorption; and
  - a middle zone, including a pair of left and right members, extending substantially longitudinally, each member extending rearward from the front zone; and
- a second section including a beam, disposed substantially in the transverse direction rearward of the middle zone, both ends of the beam being attached to the middle zone of the first section;

wherein the first section is bolted to the second section.

19. The vehicle sub-frame structure of claim 18, wherein the middle zone includes four hinges.

20. The vehicle sub-frame structure of claim 18, wherein the front zone is configured to support a radiator.

* * * * *